(No Model.) 2 Sheets—Sheet 1.

S. & C. A. BLODGET.
COFFIN.

No. 427,391. Patented May 6, 1890.

Witnesses:
Henry G. Dieterich
W. T. Duvall

By their Attorneys,
C. A. Snow & Co.

Inventors:
Stillman Blodget and
Chester A. Blodget (No Model.) 2 Sheets—Sheet 2.
S. & C. A. BLODGET.
COFFIN.
No. 427,391. Patented May 6, 1890.
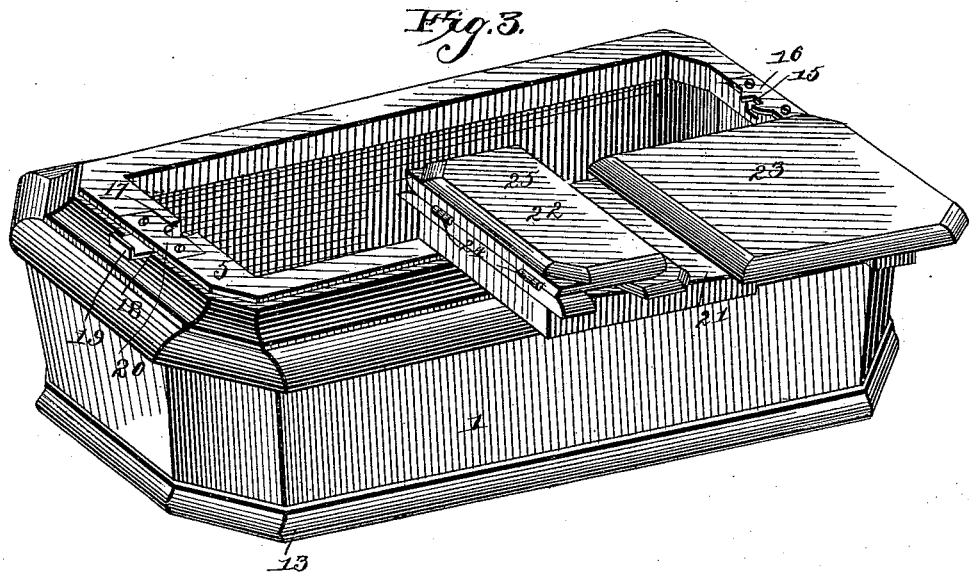
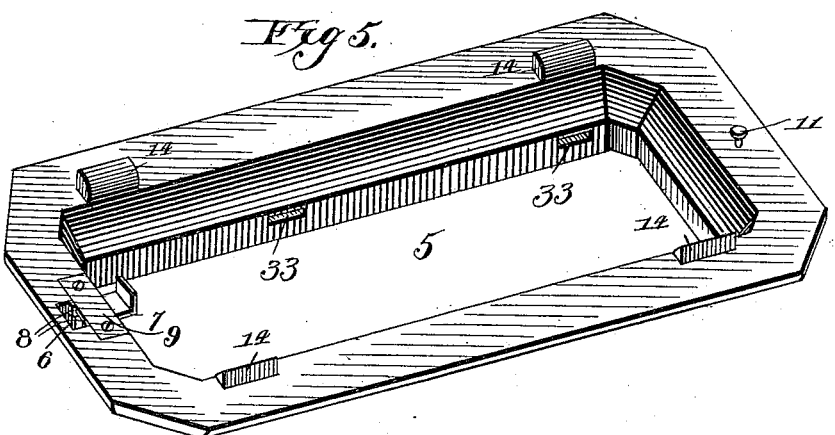
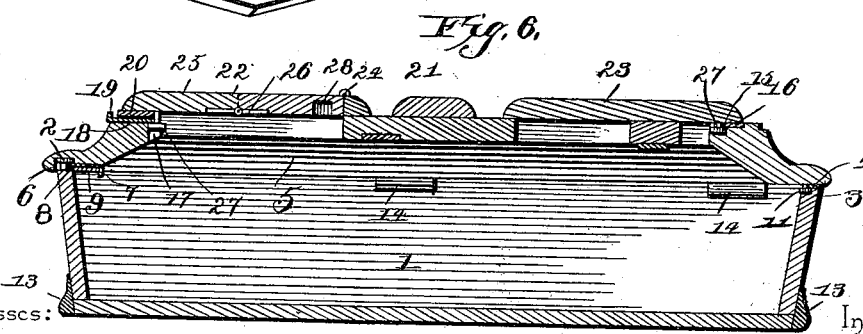
Witnesses:
Henry G. Dietrich
W. S. Hwall
By their Attorneys,
C. A. Snow & Co.
Inventors
Stillman Blodget
and
Chester A. Blodget

UNITED STATES PATENT OFFICE.

STILLMAN BLODGET AND CHESTER A. BLODGET, OF HICKSVILLE, OHIO.

COFFIN.

SPECIFICATION forming part of Letters Patent No. 427,391, dated May 6, 1890.

Application filed May 28, 1889. Serial No. 312,414. (No model.)

*To all whom it may concern:*

Be it known that we, STILLMAN BLODGET and CHESTER A. BLODGET, citizens of the United States, residing at Hicksville, in the county of Defiance and State of Ohio, have invented a new and useful Burial-Casket, of which the following is a specification.

This invention has relation to burial-caskets, and has particular reference to the construction of the lid or cover.

Among the objects in view are to so provide and connect the cover as to be foldable in sections, whereby either a portion or entire full-length view of the corpse may be obtained.

A further object of the invention is to so construct the parts as to be easily and quickly and also noiselessly connected and disconnected, and to so form the connections between certain parts—viz., the lid and molding—as to adapt the lid for removal partially, and to be supported by the molding in such a manner as to form a floral support or table, whereby flowers may be suitably grouped around the corpse, and yet a view of the same remain unobstructed.

The invention consists in certain features of construction hereinafter described, and particularly pointed out in the claims.

Figure 1:
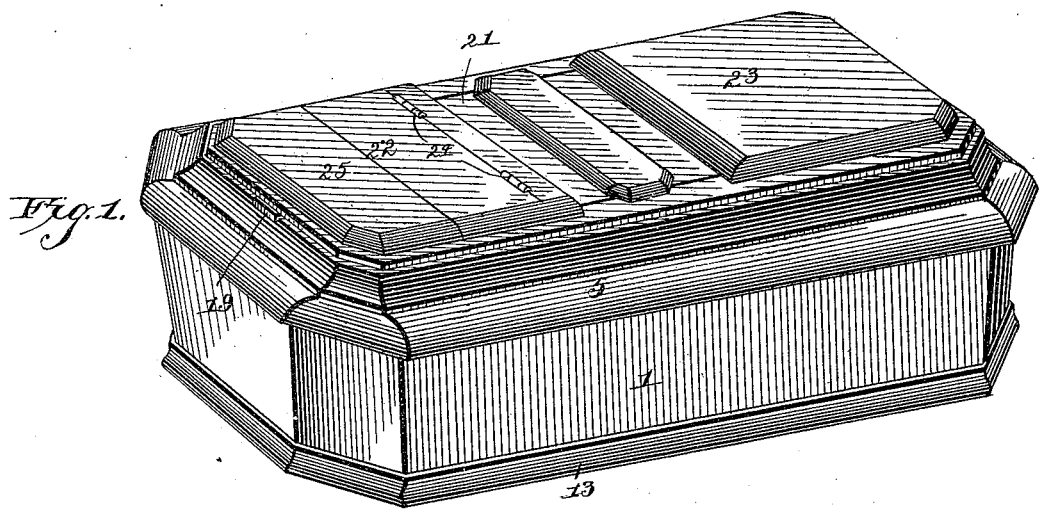
Figure 2:
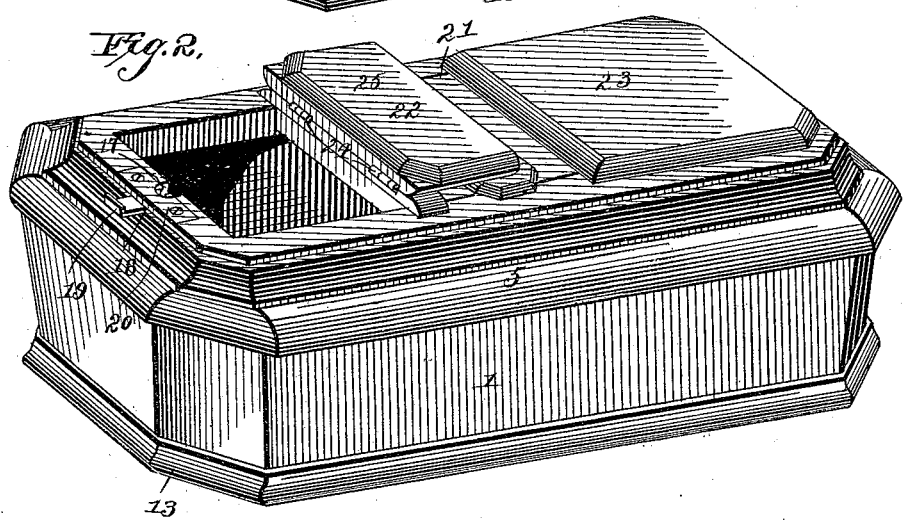
Figure 4:
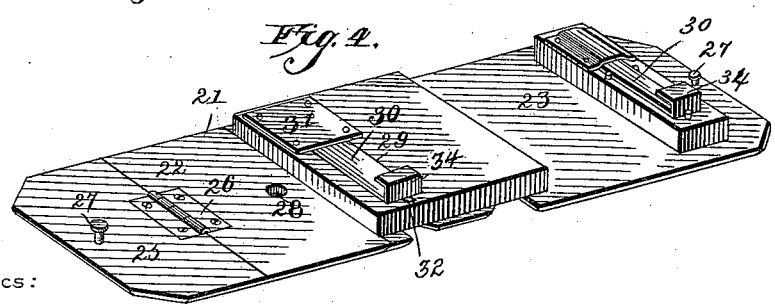

Referring to the drawings, Figure 1 is a perspective of the coffin or casket constructed in accordance with our invention. Fig. 2 is a similar view, the lid being partially removed. Fig. 3 is a similar view, the lid being wholly removed and serving as a floral support. Fig. 4 is a bottom perspective of the lid, and Fig. 5 is a similar view of the molding-section. Fig. 6 is a central longitudinal section of Fig. 1.

Like numerals of reference indicate like parts in all the figures of the drawings.

1 represents the casket, which is of the usual construction, and is provided at its head with an upwardly-projecting lug 2 and at its foot with a recess 3, over which is secured a recessed plate, the recess in the plate being smaller than that in the edge of the casket over which it is mounted.

5 represents what we term the "molding-section," the head portion of which upon its under surface is provided with a recess 6, into which is adapted to take the headed lug 2, projecting upwardly from the upper edge of the head-section of the casket. Within the recess 6 is mounted for reciprocation a sliding bolt 7, the inner end of which is bifurcated, as at 8, and adapted to be projected within the recess 6, and thus take under the head of the lug 2, projecting in the recess. A keeper 9, secured transverse of the bolt 7, serves to maintain the same in proper position within said recess. At the opposite end of the molding-section is located and projects from the under surface of said section a headed lug 11, which is adapted to pass through the recess formed in the plate 4 and rest within the recess 3, formed in the foot-section of the casket at its upper edge.

The proportion of the molding with relation to that of the casket is such that said molding overlaps or projects beyond the edges of the casket and corresponds with a lower molding 13, surrounding the casket at its base, whereby a uniformity of finish in the product is secured. Upon the under surface of the molding-section, and at opposite sides near its edge, are provided guiding-lugs 14, at such a distance apart as to fit snugly within the walls of the casket.

The frame of the molding-section is provided with a central opening somewhat reduced upon the upper surface and at the lower or foot end, and upon the inner edge is formed a recess 15, over which is mounted a recessed plate 16. At the opposite or head end is provided a vertical recess 17, communicating with which and formed upon the upper surface is a transverse recess 18, in which is mounted for reciprocation a bifurcated bolt 19, maintained in position by a keeper 20.

21 represents the actual or nominal lid of the casket, and the same is subdivided near its center into head and foot sections, (designated 22 and 23, respectively,) said sections being hinged at their adjacent edges, as at 24, and the head-section being subdivided, the folding section 25 hinged to the section 22, as at 26. At the forward end of each of the sections 23 and 25, and on the lower surface, is provided depending headed lugs 27, the lug 27 being adapted for insertion in the recess 17, formed in the molding-section, and to be maintained therein by the bifurcated bolt 19, and the opposite lug 27, or that in the section 23, being designed to enter the recess 15, and be retained therein by means of the recess plate or keeper 16, arranged over said recess. The section 22 is adapted to be folded back upon the section 23, and the section 25 to be folded forward upon the section 22, and in the section 22 we form a recess 28, adapted to receive the headed lug 27, whereby the section 25 is permitted to fold closely upon the section 22.

Transverse recesses 29 are formed near the forward and rear ends of the section 23, and upon its under surface, and mounted for movement in said recesses are sliding bolts 30, held by keepers 31, and preferably spring-pressed by means of flat springs 32, interposed within the recesses 30 and between the bolt and section. When the lid is in position upon the molding-section, these bolts are forced outwardly and take into undercut recesses 33, corresponding in form in the inner edges of the molding-section. For the purpose of providing a means whereby the lid as a whole may be removed from the casket, and thus permit of a full-length view of the body therein, we terminate the rear or non-working ends of the bolts 30 in a U-shaped manner, as at 34. By this it is apparent that by folding the sections 25 upon the section 22, and two together rearwardly upon the foot-section 23, and withdrawing the bolts 30 from the recesses 33, the lid may be removed, and the U-shaped ends 34, in which the bolts 30 terminate, may be hooked into the recesses 35, and thus support the lid in a horizontal manner at one side of the casket, whereby the lid is adapted for supporting in an artistic manner the floral offerings usually carelessly thrown upon the floor when the casket is open, or else obstructing the view of the friends of the corpse.

It will be observed that either a partial or a full-length view may be provided, and that, whether the lid be partially or wholly removed, the same may be accomplished without the removal and insertion of numerous screws or other unpleasant and to the relatives and friends distressing noises.

By reason of the convenient and easy manner of removing the molding-section, the corpse may be arranged within the casket with ease and without the disarrangement of the shroud and other portions of apparel.

Having described our invention and its operation, what we claim is—

1. In a casket, a removable molding-section secured thereto and provided with a recessed plate at one end and a reciprocating bifurcated bolt at the opposite end, in combination with a removable lid provided with depending headed lugs adapted for connection with the recessed plate and bifurcated bolt, and provided with a series of bolts adapted to be laterally projected and to take into undercut recesses formed in the inner edges of the molding-section, substantially as specified.

2. The combination, with a molding-section provided with recesses, of a removable lid having bolts mounted upon its under surface and adapted to be projected into the recesses, and having their opposite ends terminating in U-shaped connections adapted for insertion into the recesses, whereby the lid is adapted to be supported at one side of the casket, substantially as specified.

3. In a casket, a lid formed of the sections 22, 23, and 25, hinged together, as at 24 and 26, the section 22 being provided with a recess 28, adapted to receive a fastening-lug 27, formed in the section 25, substantially as specified.

4. In a casket, a molding-section having recesses 33 in its edge, in combination with the lid formed of the sections 23, 22, and 25, the section 23 being provided with recesses 29, having bolts 30, held therein by means of keepers 31, and terminating in U-shaped ends 34, and an interposed spring 32 inserted in the recesses and between the bolts and lid, substantially as specified.

In testimony that we claim the foregoing as our own we have hereto affixed our signatures in presence of two witnesses.

STILLMAN BLODGET.
  CHESTER A. BLODGET.

Witnesses:
 W. D. WILSON,
 WILSON SHARPLESS.